US011989703B2

(12) United States Patent
Mitra et al.

(10) Patent No.: US 11,989,703 B2
(45) Date of Patent: May 21, 2024

(54) METHOD AND SYSTEM OF BLOCKCHAIN DISBURSEMENTS

(71) Applicant: MASTERCARD INTERNATIONAL INCORPORATED, Purchase, NY (US)

(72) Inventors: Soumyajit Mitra, New York, NY (US); Jamal Khan, Ridgefield, NJ (US); Oskar Duris, Walnut Creek, CA (US); Sasyasri Geedipalli, Rye Brook, NY (US); Shashi Raghunandan, Old Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/391,490

(22) Filed: Aug. 2, 2021

(65) Prior Publication Data

US 2023/0033361 A1 Feb. 2, 2023

(51) Int. Cl.
*G06Q 20/40* (2012.01)
*G06F 16/28* (2019.01)
(Continued)

(52) U.S. Cl.
CPC ....... *G06Q 20/0655* (2013.01); *G06Q 20/227* (2013.01); *G06Q 20/3825* (2013.01); *G06Q 20/3827* (2013.01); *G06Q 20/3829* (2013.01)

(58) Field of Classification Search
CPC ............. G06Q 20/0655; G06Q 20/227; G06Q 20/3825; G06Q 20/3827; G06Q 20/3829;
(Continued)

(56) References Cited

U.S. PATENT DOCUMENTS

| 10,614,478 B1 * | 4/2020 | Georgi | G06F 16/2291 |
| 2004/0137986 A1 * | 7/2004 | Mercer | A63F 13/79 463/42 |

(Continued)

FOREIGN PATENT DOCUMENTS

| CA | 2791939 A1 * | 9/2011 | G06Q 30/02 |
| KR | 20190095896 A | 8/2019 | |

(Continued)

OTHER PUBLICATIONS

Farmers Market Coalition, "Supplemental Nutrition Assistance Program (SNAP)," Jul. 29, 2021 (Year: 2021).*

(Continued)

*Primary Examiner* — David P Sharvin
*Assistant Examiner* — Douglas W Pinsky
(74) *Attorney, Agent, or Firm* — Panitch Schwarze Belisario & Nadel LLP

(57) ABSTRACT

A method for facilitating benefit disbursements through the use of tokens and blockchain includes: receiving beneficiary information from a first computing system, the beneficiary information including a beneficiary identifier; storing a blockchain data entry, the blockchain data entry including a disbursement token associated with the beneficiary information and a recipient value generated using a public key of a cryptographic key pair; receiving a redemption message from a second computing system, the redemption message including the disbursement token, a digital signature generated using a private key of the cryptographic key pair, transaction account data, and a redemption amount; validating the digital signature using the public key of the cryptographic key pair; and transmitting a transfer message to the first computing system, the transfer message including the transaction account data and the redemption amount.

8 Claims, 6 Drawing Sheets

(51) Int. Cl.
  *G06Q 20/04* (2012.01)
  *G06Q 20/06* (2012.01)
  *G06Q 20/22* (2012.01)
  *G06Q 20/32* (2012.01)
  *G06Q 20/34* (2012.01)
  *G06Q 20/38* (2012.01)
  *G06Q 50/00* (2012.01)
  *H04L 29/06* (2006.01)
  *G06Q 20/10* (2012.01)
  *G06Q 20/36* (2012.01)

(58) Field of Classification Search
  CPC ............ G06Q 20/387; G06Q 30/0207; G06Q 30/0221
  See application file for complete search history.

(56) References Cited

U.S. PATENT DOCUMENTS

| | | | | |
|---|---|---|---|---|
| 2012/0271697 A1* | 10/2012 | Gilman | ............... | G06Q 20/387 705/26.35 |
| 2013/0117087 A1* | 5/2013 | Coppinger | ......... | G06Q 30/0207 705/14.27 |
| 2013/0275189 A1* | 10/2013 | Goff | ................... | G06Q 30/0641 705/14.3 |
| 2014/0108236 A1 | 4/2014 | Purves | | |
| 2015/0088753 A1* | 3/2015 | Van Der Schueren | ..................... | G06Q 20/382 705/67 |
| 2017/0046651 A1 | 2/2017 | Lin et al. | | |
| 2018/0114229 A1* | 4/2018 | Morsa | ................... | G06Q 30/02 |
| 2019/0012695 A1* | 1/2019 | Bishnoi | ............... | G06Q 20/223 |
| 2019/0080325 A1* | 3/2019 | Pourfallah | ............. | G06Q 40/02 |
| 2019/0188657 A1* | 6/2019 | Arora | ............... | G06Q 20/38215 |
| 2019/0220881 A1* | 7/2019 | Gupta | .................. | G06Q 20/387 |
| 2019/0236560 A1* | 8/2019 | Song | ...................... | G06Q 20/06 |
| 2019/0303887 A1 | 10/2019 | Wright et al. | | |
| 2019/0347624 A1* | 11/2019 | Pustizzi | ............. | G06Q 20/0457 |
| 2020/0219125 A1* | 7/2020 | Das | ........................ | G06Q 20/405 |
| 2022/0188836 A1* | 6/2022 | Scherling | .............. | H04L 9/0618 |

FOREIGN PATENT DOCUMENTS

| | | |
|---|---|---|
| WO | 2016202952 A1 | 12/2016 |
| WO | WO-2022076828 A1 * | 4/2022 |

OTHER PUBLICATIONS

Merriam-Webster Dictionary, definition of "voucher," Mar. 17, 2021 (Year: 2021).*
International Search Report (PCT/ISA/210 and Written Opinion (PCT/ISA/237) dated Nov. 7, 2022, by the Korean Intellectual Property Office as the International Searching Authority for International Application No. PCT/US2022/038139) (13 pages).

* cited by examiner

METHOD AND SYSTEM OF BLOCKCHAIN DISBURSEMENTS

FIELD

The present disclosure relates to facilitating benefit disbursements through the use of tokens and blockchain, specifically the use of a blockchain to manage the distribution and use of provided aid to increase interoperability and scaling of aid distribution.

BACKGROUND

Throughout the world, aid organizations and other non-profit groups provided money, food, shelter, and other resources to those in need. In many places, such as those that have suffered from devastation national disasters, several dozen aid groups might all operate in the area to help those that have been displaced or are otherwise in need of assistance. Often times, each of these aid groups will utilize vouchers or specialized payment cards in order to disburse benefits to recipients that are provided assistance. A recipient can receive such a voucher or specialized payment card, present it at an authorized merchant, and receive specific goods or services that are supplied, or reimbursed by, the aid organization.

However, these aid groups often act independently of one another. As a result, a recipient receiving a benefit from more than one aid group will often have to register with each aid group, receive separate vouchers and/or payment cards for each aid group, and have to keep track of which merchants can be used to redeem which voucher or payment card. Likewise, each aid group can have their own terms and conditions regarding redemption of benefits and thus every merchant will often have to perform onboarding with each individual aid group and can have to keep track of different data and processes for receiving reimbursements as a result of provided goods or services on behalf of the aid organization. The result is a system that can be laborious for both recipients and merchants that can also be difficult to scale both vertically and horizontally, which can be exceedingly detrimental in the situations where these aid organizations often operate.

Thus, there is a need for a system where interoperability of the disbursement of aid benefits can be increased that also provides for easier and more effective scaling to ensure wider and more easily disbursed and used benefits for those in need.

SUMMARY

The present disclosure provides a description of systems and methods for facilitating benefit disbursements through the use of tokens and blockchain. An aid organization creates tokens for recipients to use in place of traditional vouchers and payment cards, where the token is a digital value that is associated with fiat currency. The tokens are stored on a blockchain and distributed to a recipient via a blockchain wallet by a platform. The recipient presents their token to a merchant and transfer ownership of the token to the merchant using the blockchain wallet in lieu of presenting a traditional voucher or payment card. The merchant provides the goods or services to the recipient and redeems the token via the platform by proving ownership. The platform informs the aid organization of the redemption, who then transfers the corresponding amount of fiat currency to the merchant's bank. The result is a system that can easily be scaled due to the versatility of a blockchain. Additionally, any number of aid organizations and merchants can be involved with very little necessary onboarding, enabling significant interoperability and allowing for an aid recipient to receive disbursements through a single blockchain wallet. As a result, the use of a blockchain and disbursement tokens provides for better scaling, interoperability, and increased ease of use over traditional aid disbursement systems.

A method for facilitating benefit disbursements through the use of tokens and blockchain includes: receiving, by a receiver of a processing server, beneficiary information from a first computing system, the beneficiary information including at least a beneficiary identifier; storing, in a blockchain, a blockchain data entry, the blockchain data entry including at least a disbursement token associated with the beneficiary information and a recipient value generated using a public key of a cryptographic key pair; receiving, by the receiver of the processing server, a redemption message from a second computing system, the redemption message including at least the disbursement token, a digital signature generated using a private key of the cryptographic key pair, transaction account data, and a redemption amount; validating, by a processor of the processing server, the digital signature using the public key of the cryptographic key pair; and transmitting, by a transmitter of the processing server, a transfer message to the first computing system, the transfer message including at least the transaction account data and the redemption amount.

A system for facilitating benefit disbursements through the use of tokens and blockchain includes: a first computing system; a second computing system; a blockchain and a processing server, the processing server including a receiver receiving beneficiary information from the first computing system, the beneficiary information including at least a beneficiary identifier, wherein the blockchain stores a blockchain data entry, the blockchain data entry including at least a disbursement token associated with the beneficiary information and a recipient value generated using a public key of a cryptographic key pair; the receiver of the processing server further receives a redemption message from the second computing system, the redemption message including at least the disbursement token, a digital signature generated using a private key of the cryptographic key pair, transaction account data, and a redemption amount, and the processing server further includes a processor validating the digital signature using the public key of the cryptographic key pair, and a transmitter transmitting a transfer message to the first computing system, the transfer message including at least the transaction account data and the redemption amount.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Facilitating Benefit Disbursements

Figure 1:
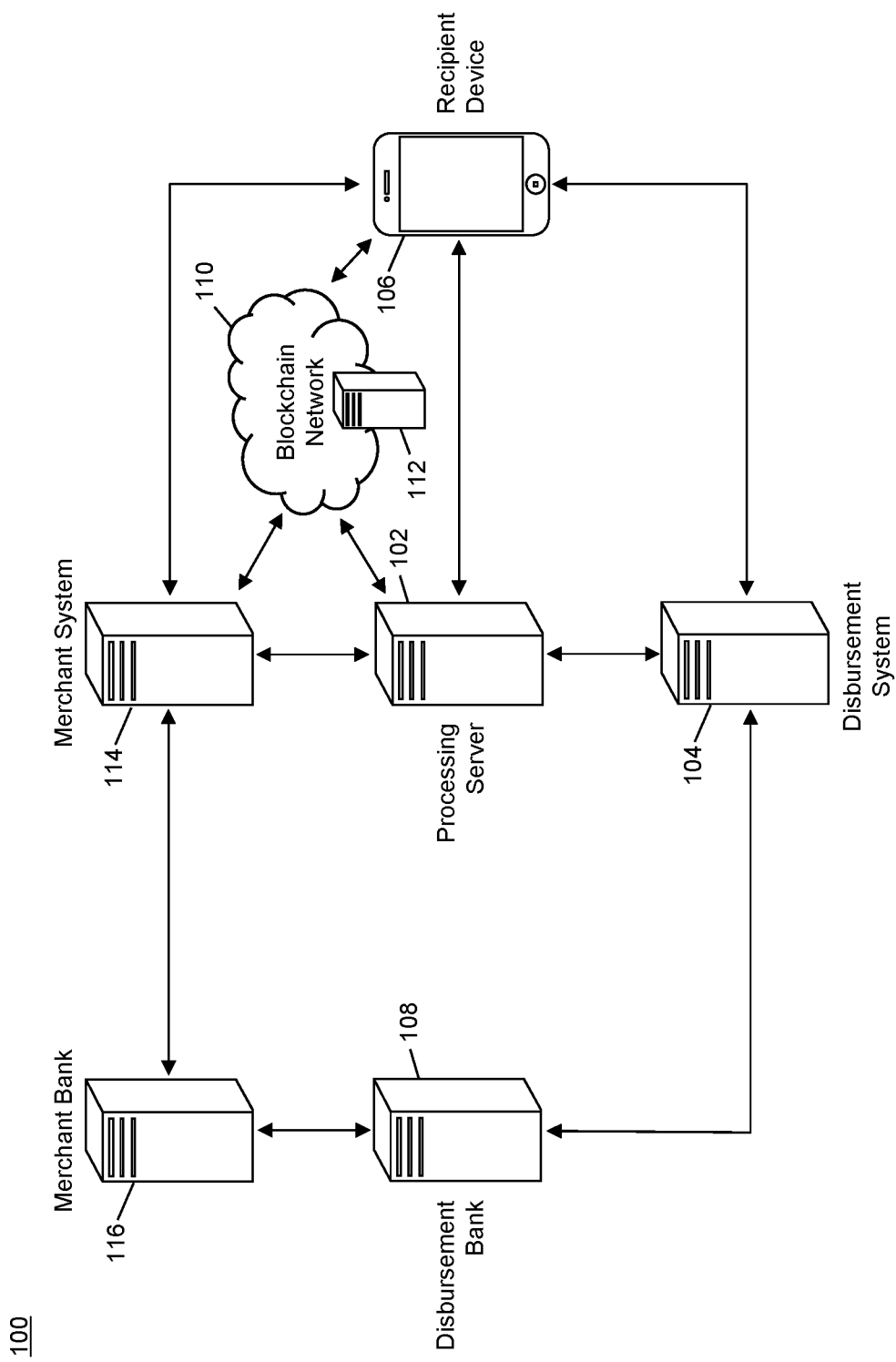
FIG. 1 is a block diagram illustrating a high level system architecture for facilitating benefit disbursements through the use of tokens and blockchain in accordance with exemplary embodiments.

FIG. 1 illustrates a system 100 for facilitating the disbursement of aid benefits through the use of tokens and a blockchain for tracking of the distribution and redemption of aid benefits.

The system 100 can include a processing server 102. The processing server 102, discussed in more detail below, can be configured to operate as a centralized platform to enable the distribution and redemption of tokens to be used for the disbursement of aid benefits on behalf of one or more aid organizations or other entities. In the system 100, a disbursement system 104 can be a computing system that is operated by or on behalf an aid organization, non-profit organization, or other entity interested in provided aid benefits to one or more recipients. In order to receive benefits, a recipient can register with the processing server 102 via a recipient device 106. The recipient device 106 can be a mobile computing device, such as a cellular phone, smart phone, smart watch, wearable computing device, etc., that is configured to execute an application program for a blockchain wallet, discussed in more detail below.

Registration with the processing server 102 by a recipient device 106 can include the transmission of a device identifier associated with the recipient device 106 to the processing server 102 along with identifying information for the recipient as a user thereof. The device identifier can be any value that is unique to the recipient device 106 among other computing devices, such as a media access control address, serial number, registration number, identification number, username, e-mail address, telephone number, etc. Identifying information for the recipient can include any value or combination of values that can be used by the recipient with an aid organization or other entity for the receipt of benefits therefrom. For instance, identifying information can include information from a government-issued identification card, such as a driver's license or passport, a social security number, a tax identification number, date of birth, legal name, etc. In an example, the recipient device 106 can register an account for the receipt of aid benefits with the processing server 102 by providing a social security number (e.g., identifying information) and e-mail address (e.g., device identifier). The recipient device 106 and processing server 102 can communicate using any suitable communication network and method, such as via a web page, application program, application programming interface, etc.

The processing server 102 can receive the registration data from the recipient device 106 and register a new profile for the recipient in a database therein or otherwise accessible thereby, such as discussed in more detail below. In some embodiments, the recipient device 106 can be provided with a blockchain wallet, discussed in more detail below, as part of the registration process. In such embodiments, the processing server 102 can generate a cryptographic key pair to be used as the blockchain wallet after receipt of data from the recipient device 106 and can electronically transmit the cryptographic key pair to the recipient device 106. The recipient device 106 can store a private key and public key that comprises the cryptographic key pair and thus have control over the blockchain wallet. In some embodiments, the recipient device 106 can already have a blockchain wallet therein, where, during the registration process, the recipient device 106 can provide the public key for the blockchain wallet to the processing server 102. In some cases, the processing server 102 can generate a cryptographic key pair to serve as a blockchain wallet for the recipient device 106 as part of the registration process, but can retain the cryptographic key pair in the recipient's profile and not provide the private key thereof to the recipient device 106 directly.

Once the recipient is registered, the recipient can contact the aid organization or other entity to request benefits. The recipient and aid organization can interact using traditional methods and systems. As part of the interaction, the recipient can provide the aid organization with at least the identifying information used during registration with the processing server 102, such as presenting the government-issued identification card to the aid organization when requesting benefits.

If the aid organization is interested in providing benefits to the recipient (e.g., the recipient qualifies to receive benefits under the program being operated by the aid organization), then the disbursement system 104 for the aid organization or other entity can generate one or more tokens. A token can be a digital data object that corresponds to one or more units of a fiat currency and can be used by the recipient in place of a traditional payment instrument to receive aid benefits from a merchant. A token can include a unique identification value that is unique to that token among all tokens generated and distributed by aid organizations or other entities that utilize the processing server's platform. In some cases, each disbursement system 104 can generate or otherwise identify the unique identification value for a new token. In other cases, the processing server 102 can generate or otherwise identify unique identification values that can be assigned to disbursement systems 104 for use in generating new tokens. A token can also include a header or other data fields that can contain values that can be used in identifying useful information for the token or in redemption of the token. For instance, a token can include a value indicative of the fiat currency to which the token is associated, a value that indicates the amount of the associated fiat currency the token represents, one or more values indicating the goods or services for which the token can be redeemed, one or more values identifying merchants through which the token can be redeemed, etc. In some embodiments, each token can be associated with a single unit of a corresponding fiat currency. In such embodiments, the disbursement system 104 can generate a plurality of disbursement tokens for a single distribution of aid benefits. For instance, a single token can be equivalent to $1, and the disbursement system 104 can generate 100 tokens for distribution to a single recipient to represent distributing $100 in goods or services to the recipient.

The disbursement system 104 can generate the token(s) necessary to distribute aid benefits to the recipient and can electronically transmit the generated token(s) to the processing server 102 using a suitable communication network and method. In embodiments where the disbursement token can include information regarding the associated currency, value, and any restrictions on use of the disbursement token, the disbursement system 104 can electronically transmit the disbursement token(s) to the processing server 102 without such data in addition to the token. In other embodiments, the disbursement system 104 can electronically transmit such information, such as the fiat currency associated with the disbursement token, the corresponding value in that fiat currency of the disbursement token, identifiers for any merchants through which the disbursement token can be used, product information regarding goods or services for which the disbursement token can be redeemed, etc.

The disbursement system 104 can also electronically transmit the identifying information for the recipient to the processing server 102. The processing server 102 can receive the identifying information and disbursement tokens and can identify a profile for the recipient using the identifying information. The processing server 102 can identify the device identifier for the recipient's recipient device 106 in the identified profile and can then proceed with distribution of the disbursement token(s) to the recipient device 106. In an exemplary embodiment, the disbursement token(s) can be stored in a blockchain with distribution thereof to the recipient device 106 being performed via transferring ownership of the disbursement token(s) to a blockchain wallet executed by the recipient device 106 or otherwise attributed to the recipient device 106.

Figure 5:
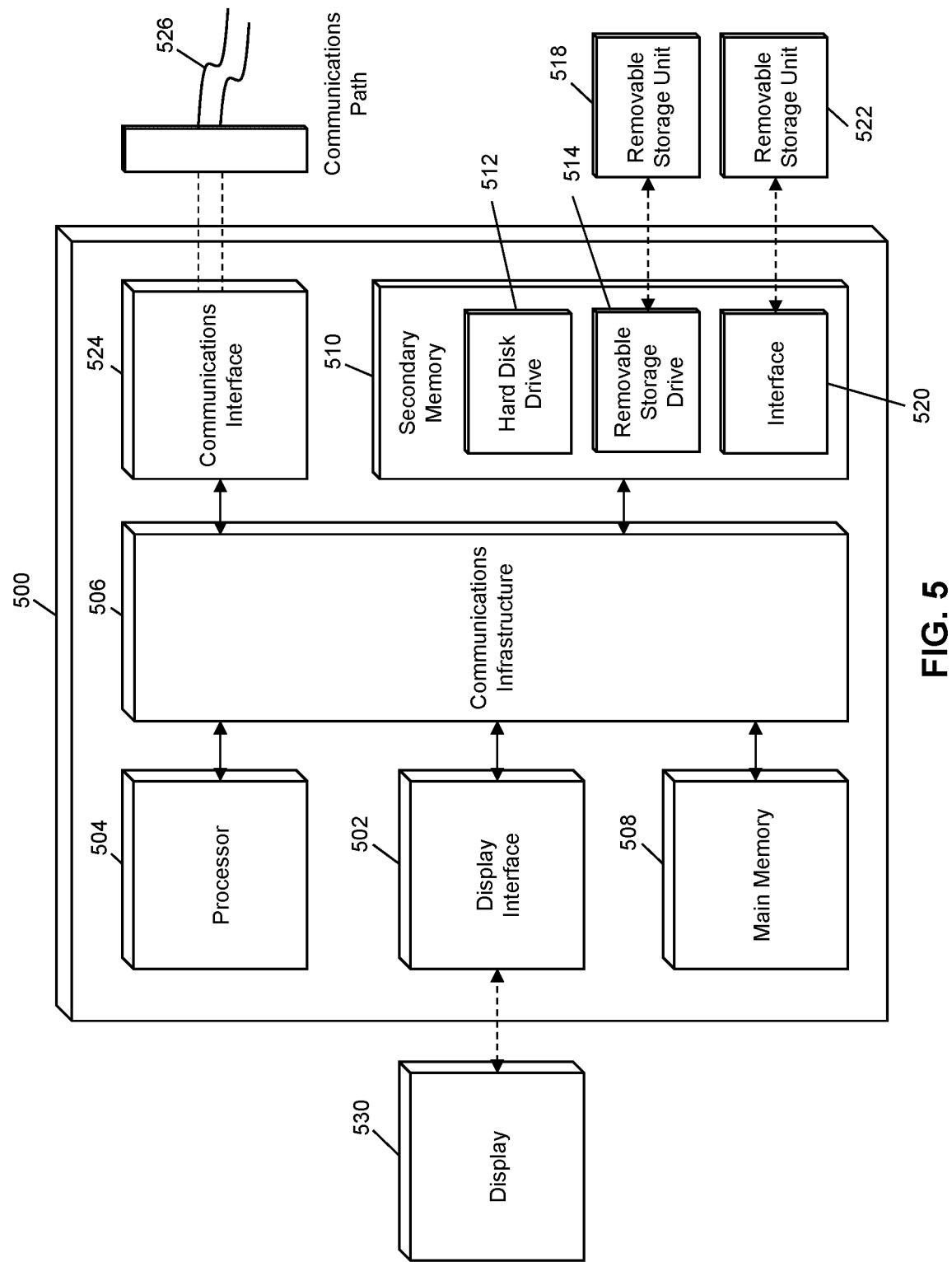
FIG. 5 is a block diagram illustrating a computer system architecture in accordance with exemplary embodiments.

To facilitate use of a blockchain, the system 100 can include a blockchain network 110. The blockchain network 110 can be comprised of a plurality of blockchain nodes 112, respectively. Each blockchain node 112 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 112 in the blockchain network 110 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 110 using the public key of the cryptographic key pair. In some cases, the term "blockchain wallet" can refer specifically to the private key. In other cases, the term "blockchain wallet" can refer to a computing device (e.g., recipient device 106, etc.) that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., the recipient device 106) that is generated using the sender's private key, a blockchain address of the recipient of currency (e.g., a merchant system 114) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 112 in the blockchain network 110, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 110 before being added to the blockchain and distributed to all of the blockchain nodes 112 in the blockchain network 110, respectively, in traditional blockchain implementations. In cases where a blockchain data value cannot be related to a blockchain transaction, but instead the storage of other types of data, blockchain data values can still include or otherwise involve the validation of a digital signature.

In the system 100, blockchain transactions can be used in the blockchain to transfer ownership of disbursement tokens. The processing server 102 can receive the disbursement token(s) from the disbursement system 104 for the recipient and can submit the disbursement token(s) to a blockchain node 112 in the blockchain network 110 for inclusion in a new blockchain data entry with a destination address generated using the public key of the recipient device's blockchain wallet. As a result, the blockchain wallet of the recipient device 106 can thus have ownership of the disbursement token(s) once the new blockchain transaction has been added to a block, confirmed, and added to the blockchain. In some embodiments, the processing server 102 itself can be a blockchain node 112 in the blockchain network 110 and generate a new blockchain data value that includes the disbursement token(s) and the destination address for the recipient device 106 and include the new blockchain data value in a newly generated block that is confirmed and added to the blockchain.

Once the disbursement token(s) have been successfully added to the blockchain, the processing server 102 can provide a notification message to the recipient device 106 to inform the recipient that the disbursement token(s) have been distributed thereto for use in receiving aid benefits. In some embodiments, the notification message can include a transaction identifier or other value unique to the blockchain data value that includes the disbursement token(s) for use by the recipient device 106 in identifying the blockchain data value on the blockchain for verification. The recipient can be free to use the disbursement token(s) to receive aid benefits subject to any limitations and restrictions on use of the tokens.

The recipient can visit or otherwise interact with a merchant through which the recipient wants to use their disbursement token(s), such as directly at a storefront for the merchant, via a merchant application program, via a web page, via telephone, etc. The recipient can select one or more goods or services for which one or more disbursement token(s) can be used as payment. In an example, an aid organization can give the recipient tokens corresponding to $50 that can be used to purchase food from authorized merchants, and the recipient can visit a grocery store and use tokens to purchase $20 worth of milk and rice. To facilitate such a payment, the recipient can initiate transfer of 20 tokens worth $1 to the merchant, initiate transfer of a single token worth $20 to the merchant, or initiate transfer of a single token worth more than $20 to the merchant, where the recipient device 106 can be issued one or more new tokens for the balance after the transferred token has been redeemed by the merchant.

In order to transfer a disbursement token to the merchant, the recipient device 106 can provide the disbursement token as well as a digital signature that is indicative of the recipient device's ownership of the disbursement token to a merchant system 114 (e.g., to a blockchain wallet thereof) associated with the merchant. In embodiments where the recipient device 106 stores the blockchain wallet (e.g., or an application program used to access the blockchain wallet, such as a digital wallet application program) locally, the recipient device 106 can generate the digital signature using the private key of the cryptographic key pair of the blockchain wallet using a suitable signature generation algorithm. In other embodiments, the processing server 102 can generate the digital signature for the disbursement token during the distribution process, where the digital signature can be electronically transmitted to the recipient device 106 as part of the notification message discussed above. The recipient device 106 can generate or identify the digital signature, as applicable, and electronically transmit the digital signature to the merchant system 114. The digital signature can be electronically transmitted to the merchant system 114 using any suitable communication network and method, such as via radio frequency, Bluetooth, wireless network, local area network, etc.

In one example, digital signatures can be transmitted using machine readable codes, such as bar codes or quick response (QR) codes. For instance, the recipient device 106 can generate or identify the digital signature and then generate a machine readable code that is encoded with the digital signature. In another example, the processing server 102 can generate the machine readable code encoded with the digital signature during the distribution process where the machine readable code is electronically transmitted to the recipient device 106 in the notification message. For instance, the recipient device 106 can receive a QR code or an image of the QR code in a short messaging service (SMS) message or e-mail from the processing server 102. The recipient device 106 can then present the QR code or image thereof to the merchant system 114 when redeeming the recipient's aid benefits. The merchant system 114 can use an optical imaging device to read the machine readable code and then decode the digital signature therefrom. In such embodiments, traditional cellular phones capable of receiving SMS messages or e-mails can still be used for the receipt and use of disbursement tokens in lieu of smartphones.

In embodiments where the disbursement token includes data indicating the associated fiat currency, value, and authorized usage, the merchant system 114 can identify such data values in the disbursement token itself to verify that the disbursement token is suitable. For instance, the merchant system 114 can verify if the disbursement token is of suitable value to cover the goods or services being purchased by the recipient. In another example, if the disbursement token is restricted to which merchants the token can be used at or for what goods or services the disbursement token can be used, the merchant system 114 can identify such data in the disbursement token to determine if the disbursement can be used at the merchant and for the goods or services being requested by the recipient. In embodiments where such data is not included in the disbursement token itself, the merchant system 114 can electronically transmit the disbursement token to the processing server 102. The processing server 102 can identify a profile associated with the disbursement token and identify data associated therewith as provided by the disbursement system 104 during initial distribution of the token. The processing server 102 can then provide such data (e.g., fiat currency, currency amount, merchant restrictions, product restrictions, etc.) to the merchant system 114 for the merchant to use in verifying that the transaction is suitable. In some cases, the merchant system 114 can provide the disbursement token along with information regarding the desired purchase (e.g., transaction amount, merchant identifier, product identifiers) to the processing server 102. In such cases, the processing server 102 can identify the profile for the token and used the data therein to determine if the transaction is suitable, and provide a result of the determination to the merchant system 114. If the transaction is suitable, the merchant system 114 can proceed with the transaction by receiving the digital signature for the disbursement token from the recipient device 106.

Once the merchant system 114 has received the digital signature for a disbursement token, the merchant can provide transacted for benefits to the receipt associated with the recipient device 106. The recipient can then be done participating in the system 100 as they can have received their benefits from the aid organization via the disbursement token(s) and transferred digital signature(s) to the merchant to use the token(s) to receive goods or services for the benefits.

After the merchant system 114 has received the digital signature, the merchant can be free to redeem the corresponding disbursement token(s) to receive the fiat currency associated therewith from the aid organization. To redeem a disbursement token, the merchant system 114 can electronically transmit the disbursement token and the digital signature to the processing server 102 using a suitable communication network and method along with account information associated with a transaction account to which the merchant would like payment to be made. The account information can include an account number, routing number, and/or any other data suitable to facilitate a payment transaction, wire transfer, or other suitable type of payment from one transaction account to another. The processing server 102 can receive the disbursement token, digital signature, and account information from the merchant system 114 and verify the digital signature. To verify the digital signature, the processing server 102 can identify the public key of the cryptographic key pair associated with the blockchain wallet to which the disbursement token was distributed and use the public key to verify the digital signature using a suitable signature generation algorithm. Upon successful verification of the digital signature, the processing server 102 can determine that the authorized recipient device 106 successfully released ownership of the disbursement token and thereby spent the disbursement token with the merchant. The processing server 102 can, directly or via a blockchain node 112, transfer ownership of the disbursement token to a new blockchain wallet, such as associated with the processing server 102 or disbursement system 104, to prevent repeated usage of the disbursement token, such as by having a new blockchain data value added to the blockchain that includes the disbursement token, the digital signature, and a destination address generated using the new blockchain wallet.

After the digital signature is verified, the processing server 102 can electronically transmit a message to the disbursement system 104 using a suitable communication network and method instructing the disbursement system 104 to initiate payment on the disbursement token to the merchant. The message can include the disbursement token and/or the fiat currency and currency amount associated therewith as well as the account information provided by the merchant system 114. The disbursement system 104 can receive the information from the processing server 102 and instruct a disbursement bank 108 to transfer funds to a merchant bank 116 associated with the merchant. The disbursement bank 108 can be a bank or other financial institution or entity that has issued a transaction account to the aid organization or other entity for use in funding electronic payment transactions. The merchant bank 116 can be a bank or other financial institution or entity that issued the transaction account associated with the account information to the merchant for use in receiving funds in electronic payment transactions. The disbursement bank 108 can receive the currency amount and account information from the disbursement system 104 and can initiate an electronic payment transaction (e.g., or wire transfer or other suitable mechanism) for the currency amount to the indicated transaction account issued by the merchant bank 116. The merchant bank 116 can receive the amount of fiat currency from the disbursement bank 108 and credit the merchant's transaction account accordingly. The merchant can thus receiving the fiat currency equivalent to the disbursement token following redemption of the disbursement token with the processing server 102.

In some embodiments, a recipient can use a single blockchain wallet for multiple disbursement systems 104 and/or merchant systems 114. In such embodiments, a new destination address can be generated by the blockchain wallet for each disbursement token received thereby, where the destination address can be used in the generation of or transmitted with a digital signature. In other embodiments, a new blockchain wallet can be used for each disbursement system 104 from which a recipient device 106 receives disbursement tokens, where each blockchain wallet can be managed via a single application program or unique application programs on the recipient device 106. In embodiments where the recipient device 106 receives QR codes with digital signatures directly from the processing server 102, the processing server 102 can use one or more blockchain wallets for each recipient as necessary.

In some embodiments, the processing server 102 can utilize the platform for the distribution of disbursement tokens that are associated with multiple fiat currencies. In such embodiments, each disbursement token can indicate (e.g., directly in the token or in a token profile stored by the processing server 102) the fiat currency with which it is registered. When the merchant system 114 initiates redemption of a disbursement token, the merchant system 114 can indicate that it wants to receive currency in the associated fiat currency of the disbursement token or via a different currency. If a different currency is indicated, the currency amount for the disbursement token can be converted from the associated fiat currency to the different currency as selected by the merchant system 114. Any suitable method can be used to perform the currency conversion. In some embodiments, the disbursement token itself (e.g., directly in a data value in the token or stored in a token profile for the disbursement token in the processing server 102) can indicate conversion factors for conversion from the associated fiat currency to one or more other fiat currencies.

The methods and systems discussed herein provide for the facilitation of the distribution of aid benefits to recipients by one or more aid organizations or other entities through the use of disbursement tokens that are stored in a blockchain. This results in a system that is significantly more scalable than traditional systems and that can provide for interoperability across multiple aid organizations, non-profit organizations, and other groups, and across multiple merchants, such that a recipient can receive benefits from a large number of organizations using a single recipient device 106 without the need for multiple payment instruments. The use of disbursement tokens also enables merchants to easily accept payment for redemption of benefits across any number of aid organizations that can be quickly redeemed for fiat currency using standard electronic payment transactions. The result is a system that is vastly improved over traditional systems for added convenience for organizations, recipients, and merchants.

Processing Server

Figure 2:
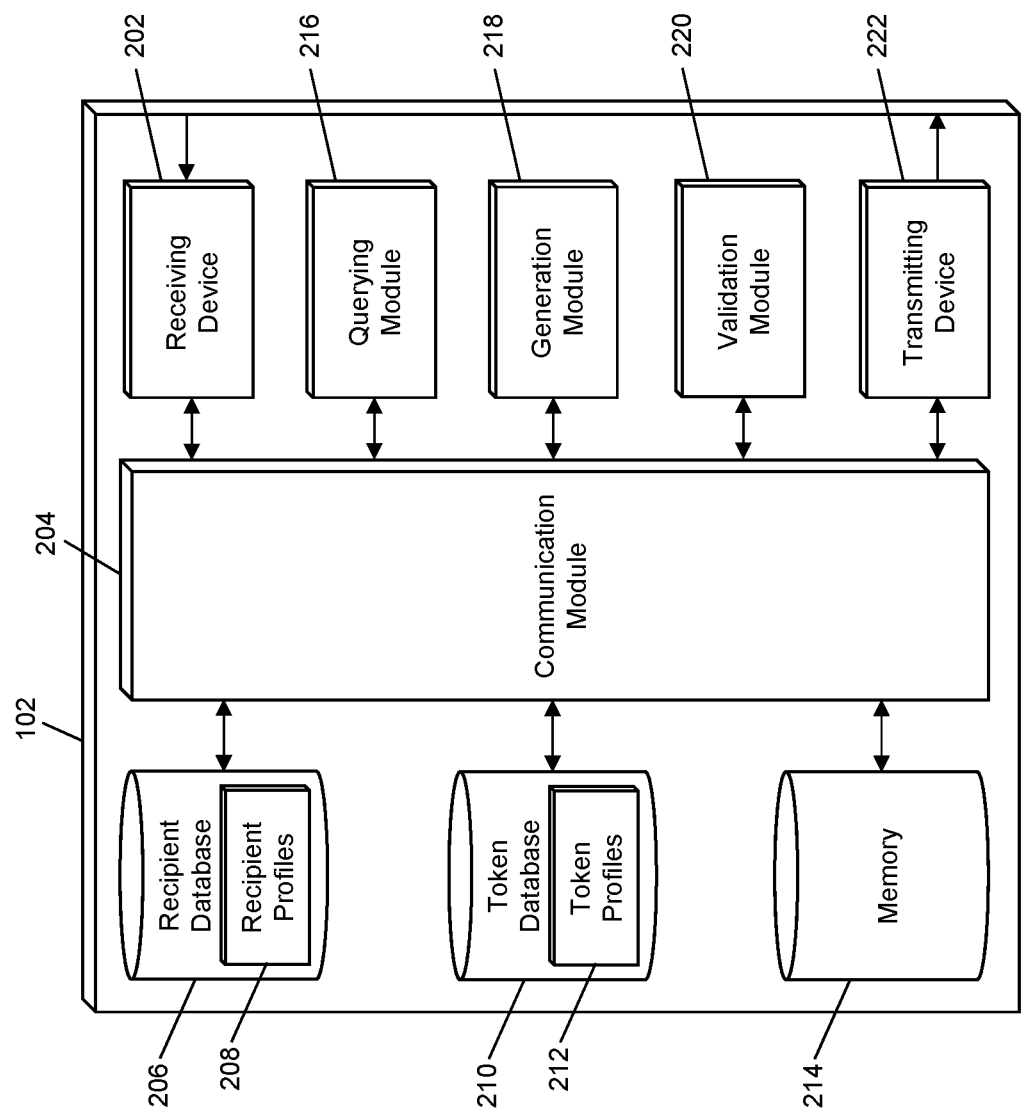
FIG. 2 is a block diagram illustrating the processing server in the system of FIG. 1 for facilitating benefit disbursements in accordance with exemplary embodiments.

FIG. 2 illustrates an embodiment of the processing server 102 in the system 100. It will be apparent to persons having skill in the relevant art that the embodiment of the processing server 102 illustrated in FIG. 2 is provided as illustration only and can not be exhaustive to all possible configurations of the processing server 102 suitable for performing the functions as discussed herein. For example, the computer system 500 illustrated in FIG. 5 and discussed in more detail below can be a suitable configuration of the processing server 102. Additional components in the system 100, such as the disbursement system 104, recipient device 106, disbursement bank 108, blockchain node 112, and merchant system 114, can include components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from disbursement systems 104, recipient devices 106, blockchain nodes 112, merchant systems 114, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by disbursement systems 104 that are superimposed or otherwise encoded with disbursement tokens and data associated therewith, such as currency amounts, merchant identifiers, product identifiers, etc. The receiving device 202 can also be configured to receive data signals electronically transmitted by recipient devices 106, which can be superimposed or otherwise encoded with registration data (e.g., device identifiers, identifying information, public keys, etc.). The receiving device 202 can also be configured to receive data signals electronically transmitted by blockchain nodes 112 that can be superimposed or otherwise encoded with blockchain data values, blocks, confirmation messages, etc. The receiving device 202 can also be configured to receive data signals electronically transmitted by merchant systems 114, which can be superimposed or otherwise encoded with disbursement tokens, digital signatures, and account information.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can include a recipient database 206. The recipient database 206 can be configured to store a plurality of recipient profiles 208 using a suitable data storage format and schema. The recipient database 206 can be a relational database that utilizes structured query language for the storage, identification, modifying, updating, accessing, etc. of structured data sets stored therein. Each recipient profile 208 can be a structured data set configured to store data related to one or more recipients and/or recipient devices 106 and can include, for example, a device identifier, identifying information, disbursement tokens, digital signatures, public keys, private keys, etc.

The processing server 102 can include a token database 210. The token database 210 can be configured to store a plurality of token profiles 212 using a suitable data storage format and schema. The token database 210 can be a relational database that utilizes structured query language for the storage, identification, modifying, updating, accessing, etc. of structured data sets stored therein. Each token profile 212 can be a structured data set configured to store data related to one or more disbursement tokens and can include, for example, the disbursement token, associated data values (e.g., fiat currency, currency amount, merchant identifiers, product identifiers, etc.), a blockchain transaction identifier, a public key of the blockchain wallet to which the disbursement token was distributed, etc.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, communication information, data formatting rules, distribution token values, blockchain data, signature generation algorithms, currency conversion data, account information, etc.

The processing server 102 can include a querying module 216. The querying module 216 can be configured to execute queries on databases to identify information. The querying module 216 can receive one or more data values or query strings and can execute a query string based thereon on an indicated database, such as the memory 214 of the processing server 102 to identify information stored therein. The querying module 216 can then output the identified information to an appropriate engine or module of the processing server 102 as necessary. The querying module 216 can, for example, execute a query on the recipient database 206 to identify a recipient profile 208 that includes identifying information received from a disbursement system 104 to identify a recipient device 106 to which disbursement tokens are to be distributed.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate notification messages, confirmation messages, blockchain data values, blocks, digital signatures, machine readable codes, distribution tokens, unique identification values, etc.

The processing server 102 can also include a validation module 220. The validation module 220 can be configured to perform validations for the processing server 102 as part of the functions discussed herein. The validation module 220 can receive instructions as input, which can also include data to be used in performing a validation, can perform a validation as requested, and can output a result of the validation to another module or engine of the processing server 102. The validation module 220 can, for example, be configured to validate digital signatures and cryptographic signatures using suitable signature generation algorithms and keys, validate disbursement tokens and uses thereof, etc.

The processing server 102 can also include a transmitting device 222. The transmitting device 222 can be configured to transmit data over one or more networks via one or more network protocols. In some instances, the transmitting device 222 can be configured to transmit data to disbursement systems 104, recipient devices 106, blockchain nodes 112, merchant systems 114, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to disbursement systems 104 that can be superimposed or otherwise encoded with disbursement tokens and account information. The transmitting device 222 can also be configured to electronically transmit data signals to recipient devices 106, which can be superimposed or otherwise encoded with disbursement tokens, digital signatures, machine readable codes, notification messages, etc. The transmitting device 222 can also be configured to electronically transmit data signals to blockchain nodes 112 that can be superimposed or otherwise encoded with disbursement tokens, destination address, blockchain data values, blocks, confirmation messages, etc. The transmitting device 222 can also be configured to electronically transmit data signals to merchant systems 114 that are superimposed or otherwise encoded with determinations regarding disbursement tokens, data values associated with disbursement tokens, etc.

Process for Facilitating Distribution and Redemption of Disbursement Tokens

Figure 3A:
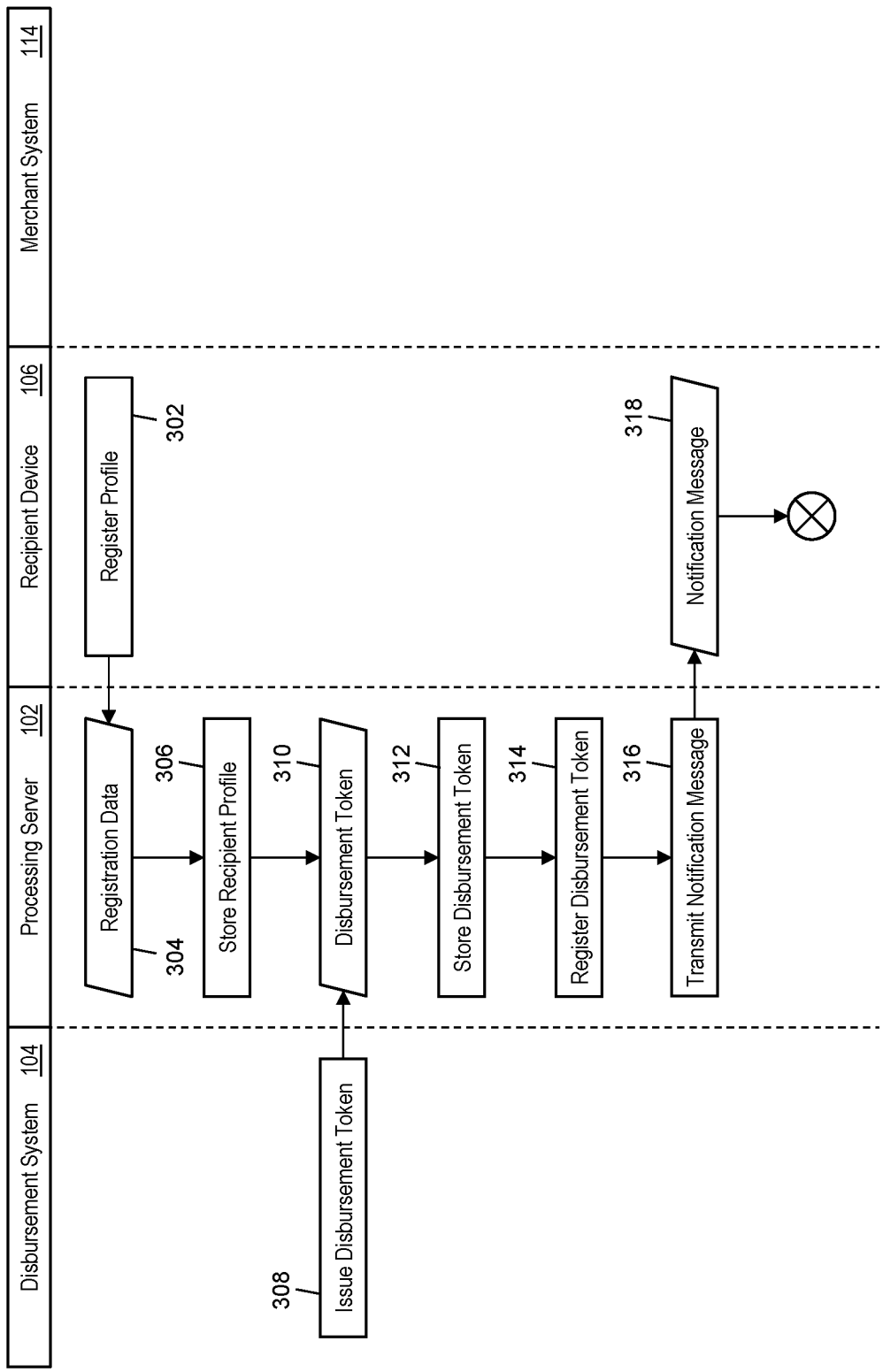
FIGS. 3A and 3B are a flow diagram illustrating a process for facilitating benefit disbursements through the use of tokens and blockchain in the system of FIG. 1 in accordance with exemplary embodiments.
Figure 3B:
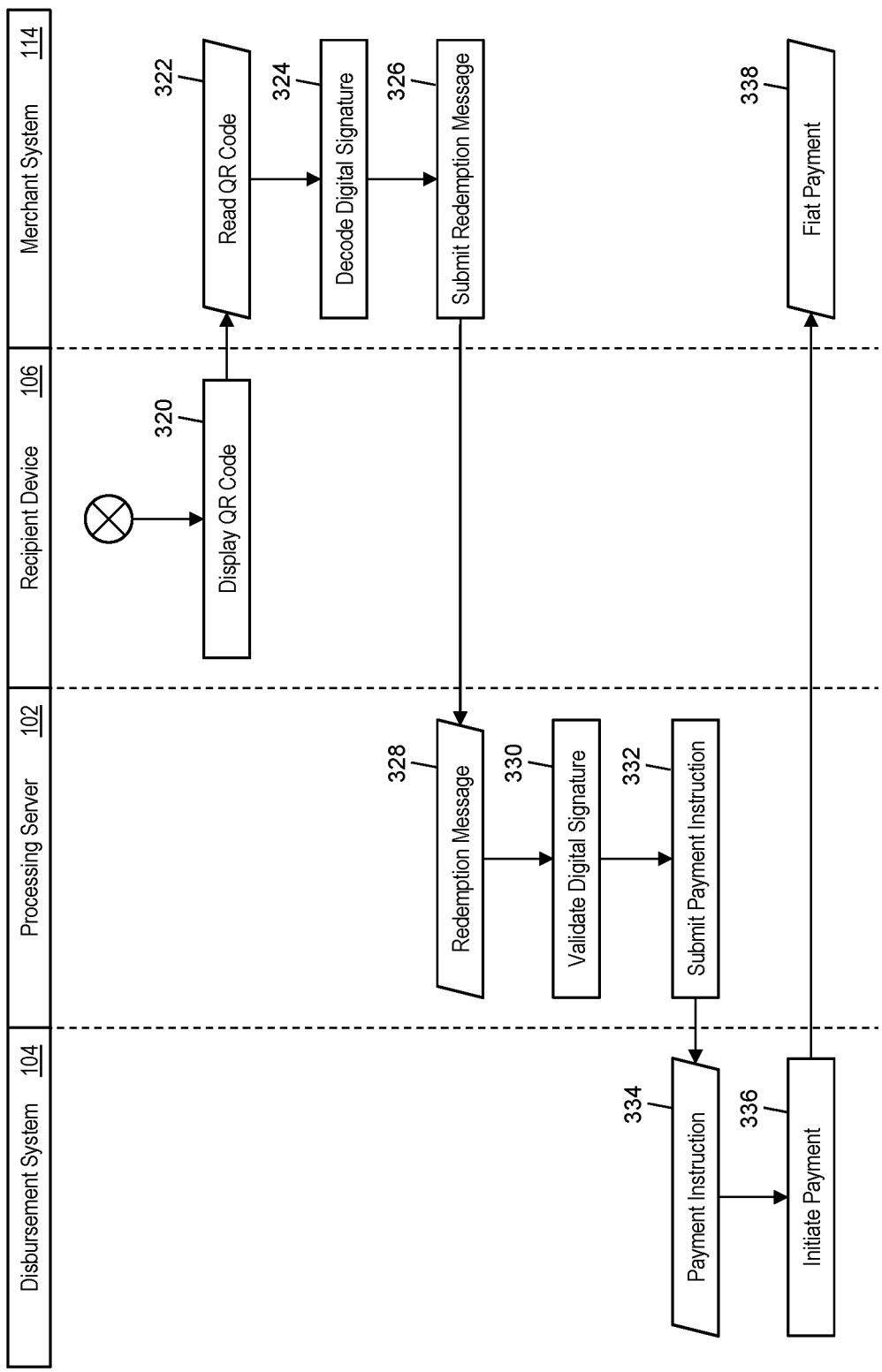

FIGS. 3A and 3B illustrate a process for facilitating the distribution of disbursement tokens via a blockchain and redemption thereof for the distribution and redemption of aid benefits in the system 100.

In step 302, a recipient interested in receiving aid benefits from an aid organization or other entity can register for the receipt of benefits via disbursement tokens with the processing server 102 using a recipient device 106. The recipient device 106 can electronically transmit at least a device identifier associated with the recipient device 106 and identifying information associated with the recipient to the processing server 102 using a suitable communication network and method. In step 304, the receiving device 202 of the processing server 102 can receive the data from the recipient device 106. In step 306, the querying module 216 of the processing server 102 can execute a query on the recipient database 206 of the processing server 102 to insert a new recipient profile 208 therein for the recipient that includes at least the device identifier and identifying information.

In step 308, the disbursement system 104 associated with the aid organization or other entity that wants to distribute benefits to the recipient can issue one or more disbursement tokens intended for the recipient to the processing server 102. Each disbursement token can be a data object that includes a token identification value and additional data values indicating the fiat currency and amount thereof for which the disbursement token represents and any values regarding restrictions on use and redemption of the disbursement token. In step 310, the receiving device 202 of the processing server 102 can receive the disbursement token from the disbursement system 104, which can be accompanied by the new recipient profile 208 that was created in step 306 that contains identifying information associated with the recipient to which the disbursement token is being issued.

In step 312, the querying module 216 of the processing server 102 can execute a query on the token database 210 of the processing server 102 to store a new token profile 212 therein that includes at least the disbursement token and identifying information associated with the recipient. In step 314, the processing server 102 can register the disbursement token. Registration of the disbursement token can include performing functions necessary for the distribution of the disbursement token to the recipient and use thereof. As part of the registration, the generation module 218 of the processing server 102 can generate a cryptographic key pair comprised of a private key and a public key to serve as a blockchain wallet for the disbursement token. The generation module 218 can also generate a digital signature using the private key and a signature generation algorithm and generate a destination address using the public key. The transmitting device 222 of the processing server 102 can electronically transmit the disbursement token and destination address to a blockchain node 112 in the blockchain network 110 for inclusion in a new blockchain data value that is included in a new block that is generated and added to the blockchain. The generation module 218 of the processing server 102 can also generate a QR code that is encoded with at least the generated digital signature and the disbursement token. In some embodiments, the querying module 216 of the processing server 102 can execute a query on the token database 210 of the processing server 102 to update the token profile 212 associated with the disbursement token to add the cryptographic key pair thereto.

In step 316, the transmitting device 222 of the processing server 102 can electronically transmit a notification message to the recipient device 106 using a suitable communication network and method, such as via SMS message, e-mail, an application program, etc. The notification message can include at least the QR code. In step 318, the recipient device 106 can receive the notification message. The recipient can take the recipient device 106 to a merchant and select one or more goods or services for purchase using the disbursement token. In step 320, the recipient device 106 can display the QR code on a display device thereof for reading by the merchant system 114. In step 322, the merchant system 114 can use an optical imaging device, such as a camera, to read the QR code. In step 324, the merchant system 114 can decode the disbursement token and digital signature from the QR code using traditional methods. In cases where the disbursement token can be subject to one or more restrictions on use, the merchant system 114 can first verify (e.g., directly or using the processing server 102) that the disbursement token is being used in accordance with any applicable restrictions, such as on merchant, product type, amount, etc. In step 326, the merchant system 114 can electronically transmit a redemption message to the processing server 102 using a suitable communication network and method. The redemption message can include at least the disbursement token, the digital signature, and account information associated with a transaction account for which the merchant would like to receive the fiat currency equivalent to the disbursement token.

In step 328, the receiving device 202 of the processing server 102 can receive the redemption message from the merchant system 114. In step 330, the processing server 102 can validate the digital signature. The querying module 216 of the processing server 102 can execute a query on the token database 210 of the processing server 102 to identify the token profile 212 that includes the disbursement token and identify the public key stored therein. The validation module 220 of the processing server 102 can validate the digital signature using the public key and signature generation algorithm. Upon successful validation, in step 332, the transmitting device 222 of the processing server 102 can electronically transmit a payment instruction message to the disbursement system 104 using a suitable communication network and method. The payment instruction message can include at least the disbursement token and the account information received in the redemption message.

In step 334, the disbursement system 104 can receive the payment instruction message from the processing server 102. In step 336, the disbursement system 104 can initiate an electronic payment transaction for payment of the currency amount of fiat currency corresponding to the disbursement token to the transaction account associated with the account information received in the payment instruction message. Initiation of the electronic payment transaction can include providing the currency amount and account information to the disbursement bank 108. The disbursement bank 108 can transfer the appropriate amount of fiat currency to the merchant bank 116, which can credit the transaction account indicated in the account information with the appropriate amount. In step 338, the merchant can accordingly receive payment of the appropriate amount of fiat currency following redemption of the disbursement token that was accepted as payment for the goods or services transacted by the recipient for their aid benefits as provided by the aid organization or other entity.

Exemplary Method for Facilitating Benefit Disbursements

Figure 4:
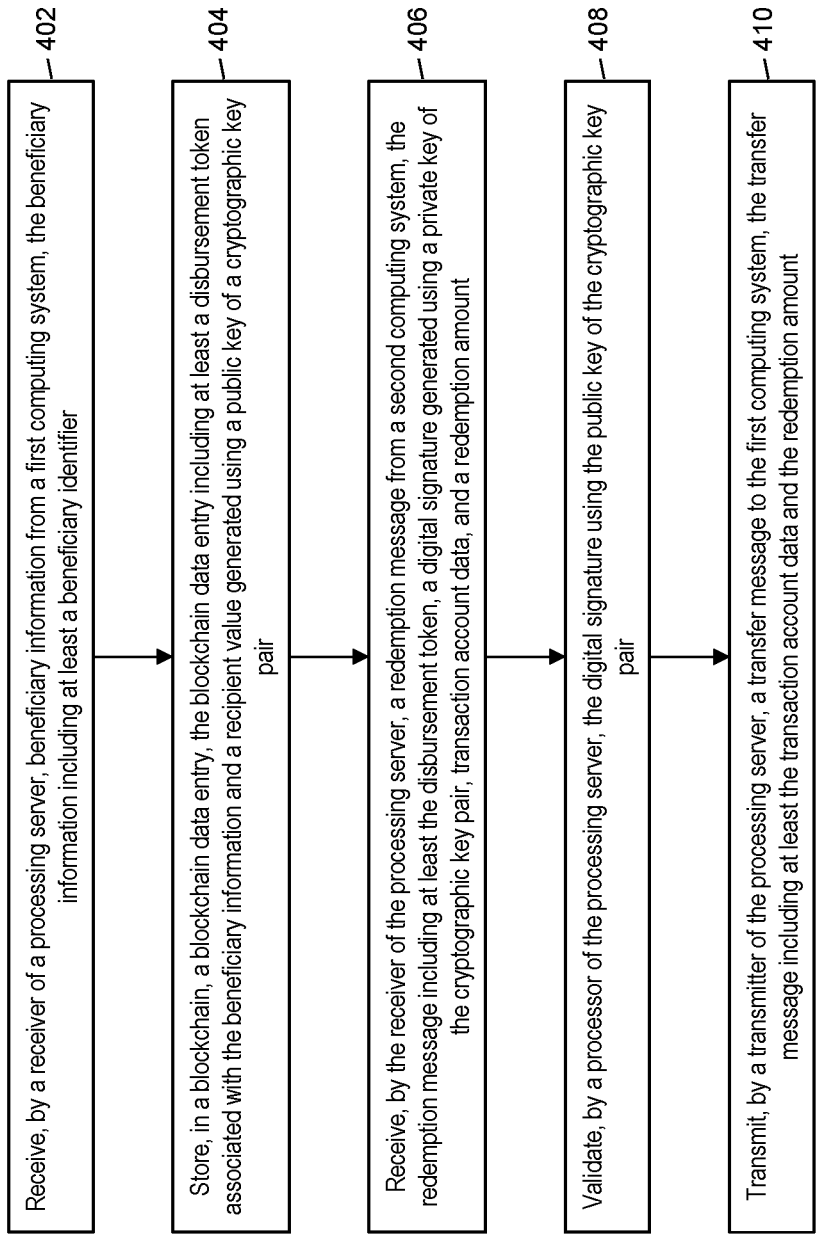
FIG. 4 is a flow chart illustrating an exemplary method for facilitating benefit disbursements through the use of tokens and blockchain in accordance with exemplary embodiments.

FIG. 4 illustrates a method 400 for facilitating benefit disbursements through the use of tokens and blockchain.

In step 402, beneficiary information can be received from a first computing system (e.g., disbursement system 104) by a receiver (e.g., receiving device 202) of a processing server (e.g., processing server 102), the beneficiary information including at least a beneficiary identifier (e.g., identifying information). In step 404, a blockchain data entry can be stored in a blockchain, the blockchain data entry including at least a disbursement token associated with the beneficiary information and a recipient value generated using a public key of a cryptographic key pair.

In step 406, a redemption message can be received by the receiver of the processing server from a second computing system (e.g., merchant system 114), the redemption message including at least the disbursement token, a digital signature generated using a private key of the cryptographic key pair, transaction account data, and a redemption amount. In step 408, the digital signature can be validated by a processor (e.g., validation module 220) of the processing server using the public key of the cryptographic key pair. In step 410, a transfer message can be transmitted by a transmitter (e.g., transmitting device 222) of the processing server to the first computing system, the transfer message including at least the transaction account data and the redemption amount.

In one embodiment, wherein the beneficiary information can comprise the disbursement token. In some embodiments, the method 400 can further include generating, by the processor (e.g., generation module 218) of the processing server, the disbursement token based on at least the received beneficiary information. In one embodiment, the beneficiary information can further include a currency amount, and the redemption amount can be less than or equal to the currency amount. In some embodiments, the beneficiary information can further include the disbursement token, and the transfer message can further include the disbursement token. In one embodiment, the method 400 can further include: receiving, by a receiver of a fourth computing system (e.g., disbursement bank 108), a payment instruction from the first computing system, the payment instruction including at least the transaction account data, the redemption amount, and source account data; and initiating, by a processor of the fourth computing system, an electronic payment transaction for payment of the redemption amount from a first transaction account associated with the source account data to a second transaction account associated with the transaction account data.

In some embodiments, the method 400 can also include transmitting, by the transmitter of the processing server, a notification message to a third computing system (e.g., recipient device 106), wherein the third computing system is identified based on at least the beneficiary identifier. In a further embodiment, the notification message can include the private key of the cryptographic key pair. In another further embodiment, the notification message can include a machine readable code encoded with the private key of the cryptographic key pair. In yet another further embodiment, the notification message can include the digital signature.

Computer System Architecture

FIG. 5 illustrates a computer system 500 in which embodiments of the present disclosure, or portions thereof, can be implemented as computer-readable code. For example, processing server 102 of FIGS. 1 and 2 and the disbursement system 104, recipient device 106, disbursement bank 108, blockchain node 112, and merchant system 114 of FIG. 1 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for facilitating benefit disbursements through the use of tokens and blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for facilitating benefit disbursements through the use of tokens and blockchain, comprising:
   receiving, from a recipient device, by a receiver of a processing server, registration data of a recipient of one or more aid benefits provided by one or more aid organizations, the registration data including at least a recipient device identifier and recipient identifying information of a recipient qualified to receive the one or more aid benefits;
   executing, by a querying module of the processing server via a communication module of the processing server, a query on a recipient database comprising inserting a recipient profile including the registration data;
   receiving, by a receiver of the processing server, a disbursement token and the recipient identifying information from a benefits disbursement computing system associated with one of the one or more aid organizations;
   executing, by the querying module of the processing server via the communication module of the processing server, a query on the recipient database comprising identifying the recipient profile;
   executing, by the querying module of the processing server via the communication module of the processing server, a query on a token database comprising storing a token profile, the token profile including at least the disbursement token and the recipient identifying information;
   generating, by a generation module of the processing server, a cryptographic key pair including a private key and a public key;
   generating, by the generation module of the processing server, a digital signature using the private key and a destination address using the public key;
   executing, by the querying module of the processing server via the communication module of the processing server, a query on the token database comprising updating the token profile with the cryptographic key pair;
   generating, by the generation module of the processing server, a machine readable code, the machine readable code encoded with at least the digital signature and the disbursement token;
   transmitting, by the generation module of the processing server via the communication module of the processing server, the machine readable code to the transmitting device of the processing server;
   identifying, by the processing server, the recipient device based on at least the recipient identifying information;
   transmitting, by the transmitter of the processing server, a notification message to the recipient device, wherein the notification message includes the machine readable code;
   transmitting, by a transmitter of the processing server, a blockchain data entry to a blockchain, the blockchain data entry including at least the disbursement token and the destination address;
   receiving, by the receiver of the processing server, a redemption message from a merchant computing system, the redemption message including at least the disbursement token, the digital signature, transaction account data, and a redemption amount;
   validating, by a processor of the processing server, the digital signature using the public key of the cryptographic key pair, wherein the validating the digital signature includes:
      executing, by the querying module of the processing server via the communication module of the processing server, a query on the token database comprising identifying the token profile that includes the disbursement token included in the redemption message;
   transmitting, by a transmitter of the processing server, a transfer message to the benefits disbursement computing system associated with the one of the one or more aid organizations, the transfer message including at least the transaction account data and the redemption amount;
   receiving, by a receiver of a financial entity computing system, a payment instruction from the benefits disbursement computing system, the payment instruction including at least the transaction account data, the redemption amount, and source account data; and initiating, by a processor of the financial entity computing system, an electronic payment transaction for payment of the redemption amount from a first transaction account associated with the source account data to a second transaction account associated with the transaction account data.

2. The method of claim 1, wherein the notification message includes the private key of the cryptographic key pair.

3. The method of claim 1, wherein the notification message includes the digital signature.

4. The method of claim 1, wherein the recipient identifying information further includes a currency amount, and the redemption amount is less than or equal to the currency amount.

5. A system for facilitating benefit disbursements through the use of tokens and blockchain, comprising:

a recipient device;

a benefits disbursement computing system associated with an aid organization;

a merchant computing system;

a blockchain; and a processing server, the processing server configured to:

receive, from a recipient device, by a receiver of the processing server, registration data of a recipient of one or more aid benefits provided by one or more aid organizations, the registration data including at least a recipient device identifier and recipient identifying information of a recipient qualified to receive the one or more aid benefits;

execute, by a querying module of the processing server via a communication module of the processing server, a query on a recipient database comprising inserting a recipient profile including the registration data;

receive, by the receiver of the processing server, a disbursement token and the recipient identifying information from the benefits disbursement computing system associated with the aid organization;

execute, by the querying module of the processing server via the communication module of the processing server, a query on the recipient database to comprising identifying the recipient profile;

execute, by the querying module of the processing server via the communication module of the processing server, a query on a token database to comprising storing a token profile, the token profile including at least the disbursement token and the recipient identifying information;

generate, by a generation module of the processing server, a cryptographic key pair including a private key and a public key;

generate, by the generation module of the processing server, a digital signature using the private key and a destination address using the public key;

execute, by the querying module of the processing server via the communication module of the processing server, a query on the token database comprising updating the token profile with the cryptographic key pair;

generate, by the generation module of the processing server, a machine readable code, the machine readable code encoded with at least the digital signature and the disbursement token;

transmit, by the generation module of the processing server via the communication module of the processing server, the machine readable code to the transmitting device of the processing server;

identify, by the processing server, the recipient device based on at least the recipient identifying information;

transmit, by the transmitter of the processing server, a notification message to the recipient device, wherein the notification message includes the machine readable code;

transmit, by a transmitter of the processing server, a blockchain data entry to a blockchain, the blockchain data entry including at least the disbursement token and the destination address;

receive, by the receiver of the processing server, a redemption message from the merchant computing system, the redemption message including at least the disbursement token, the digital signature, transaction account data, and a redemption amount;

validate the digital signature using the public key of the cryptographic key pair, wherein the validating the digital signature includes:

executing, by the querying module of the processing server via the communication module of the processing server, a query on the token database comprising identifying the token profile that includes the disbursement token included in the redemption message; and transmit, by the transmitter of the processing server, a transfer message to the benefits disbursement computing system associated with the aid organization, the transfer message including at least the transaction account data and the redemption amount;

wherein the system further comprises a financial entity computing system, the financial entity computing system including:

a receiver receiving a payment instruction from the benefits disbursement computing system, the payment instruction including at least the transaction account data, the redemption amount, and source account data; and a processor initiating an electronic payment transaction for payment of the redemption amount from a first transaction account associated with the source account data to a second transaction account associated with the transaction account data.

6. The system of claim 5, wherein the notification message includes the private key of the cryptographic key pair.

7. The system of claim 5, wherein the notification message includes the digital signature.

8. The system of claim 5, wherein the recipient identifying information further includes a currency amount, and the redemption amount is less than or equal to the currency amount.

* * * * *